INVENTOR.
CHRISTOPHER K. BROWN
BY
ATTORNEY

Oct. 12, 1965     C. K. BROWN     3,210,959

TORQUE DEVICE

Filed May 17, 1963     7 Sheets-Sheet 2

INVENTOR.
CHRISTOPHER K. BROWN
BY
ATTORNEY

Oct. 12, 1965     C. K. BROWN     3,210,959
TORQUE DEVICE

Filed May 17, 1963     7 Sheets-Sheet 3

INVENTOR.
CHRISTOPHER K. BROWN
BY
ATTORNEY

Oct. 12, 1965  C. K. BROWN  3,210,959
TORQUE DEVICE

Filed May 17, 1963  7 Sheets-Sheet 4

INVENTOR.
CHRISTOPHER K. BROWN
BY
ATTORNEY

Oct. 12, 1965　　　　C. K. BROWN　　　　3,210,959
TORQUE DEVICE

Filed May 17, 1963　　　　　　　　　　　　　　7 Sheets-Sheet 5

INVENTOR.
CHRISTOPHER K. BROWN
BY
ATTORNEY

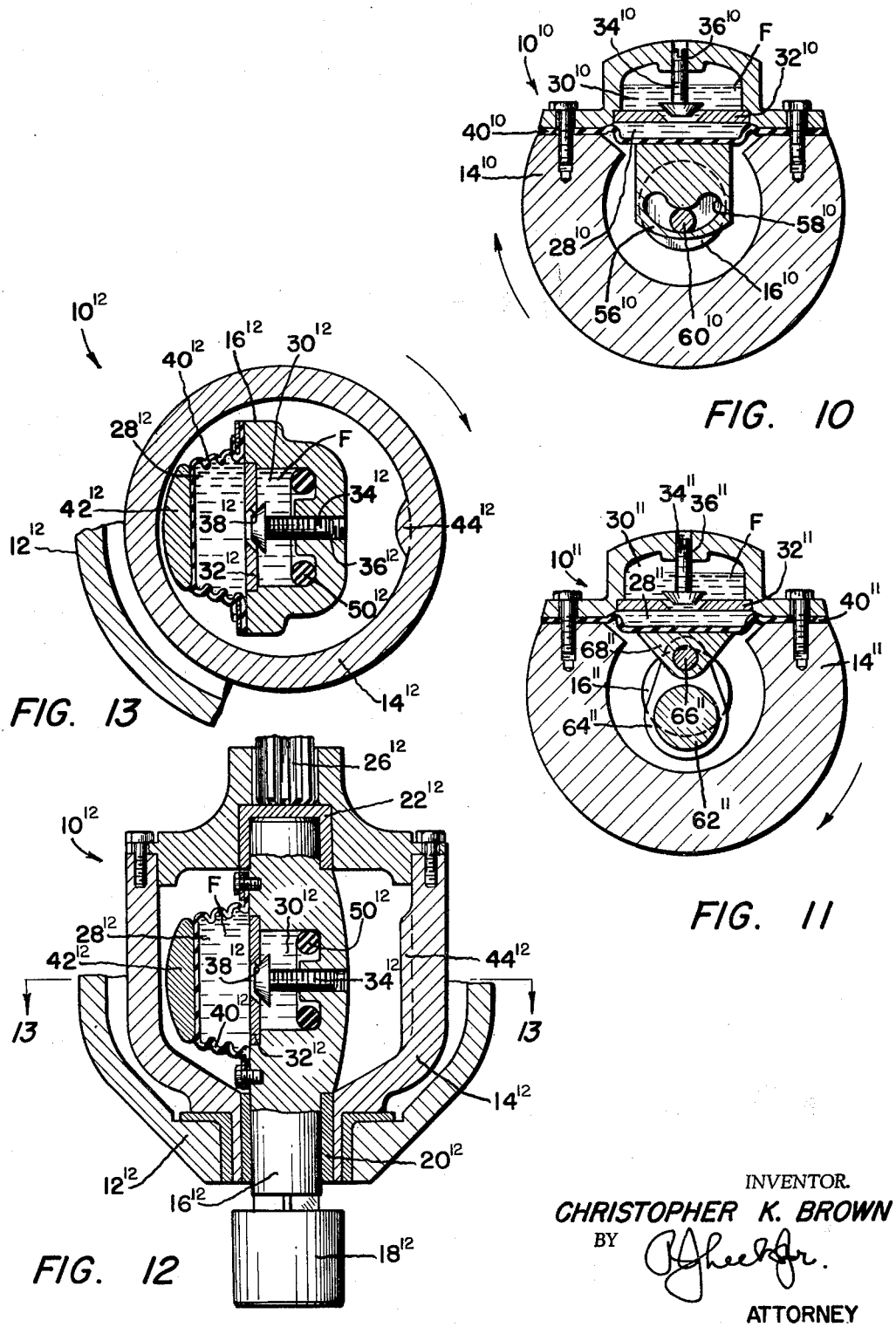

INVENTOR.
CHRISTOPHER K. BROWN
BY
ATTORNEY

United States Patent Office 3,210,959
Patented Oct. 12, 1965

3,210,959
TORQUE DEVICE
Christopher K. Brown, Camp Hill, Pa., assignor to Ingersoll-Rand Company, New York, N.Y., a corporation of New Jersey
Filed May 17, 1963, Ser. No. 281,158
44 Claims. (Cl. 64—26)

The present invention relates to power tools and, more particularly, to an improved torque tool of the impulse type.

Heretofore, conventional portable, power operated tools for driving nuts, bolts and screws or for applying a torque to other objects have been of the stall, clutch and impact type. While the stall type and clutch type tools give satisfactory torque control in most applications, these types are larger and hence heavier than the impact type tool. Further, the stall type and clutch type tools are slower in operation than the impact type tool. In addition, the stall type and clutch type tools provide an undesirable torque reaction to the operator, which torque reaction is not present in a tool of the impact type.

In the impact type of tool, the kinetic energy of the rotary hammer (of large mass) is transferred to the spindle (of relatively lower mass) by a collision between the jaws of the hammer and the spindle. These conventional impact tools have several limitations. First, the rigid jaws of the hammer and the similar jaws of the spindle are relatively light in order to satisfy the demand of the fabricating industries for a light, portable tool. However, the forces between the jaws of the hammer and the jaws of the spindle are very high during the time of impact therebetween, with resultant breakage or failure of such jaws and a shorter service life than in other conventional power tools, such as those of the stall or clutch type. Secondly, with these conventional impact tools it is very difficult to control or limit the final torque on a threaded fastener to a final predetermined value within satisfactory limits of accuracy. Further, the impact tools are difficult to manufacture because of their complicated structure and are rather noisy in their operation.

Conventional driven impact tools provided with mechanical clutches are of the type shown in United States Patent #2,940,565 issued June 14, 1960 to C. T. Schodeberg. Tools of the type shown in U.S. Patent #2,028,441 issued January 21, 1936 to A. G. Decker, employ friction surfaces in a rotating clutch housing to transmit torque impulses to cammed surfaces of the spindle and wherein the friction surfaces are spring biased.

Fluid operated clutches are of the type shown in U.S. Patent #1,780,199 issued November 4, 1930 to B. A. Linderman, whereas U.S. Reissue Patent #13,021 issued September 14, 1909 to G. F. Leiger shows a fluid pressure operated clutch supplemented by a centrifugal action to control speed where the operation of the diaphragm is in response to fluid pressure and speed. In U.S. Patent #2,900,811 issued August 25, 1959 to J. E. De Selms, a combination is shown of a clutch structure, mechanical or friction coupling and two chamber hydraulic action to control the clutch operation.

U.S. Patent #2,708,018 issued May 10, 1955 to R. A. Dudley is typical of a pressure fluid drive tool. U.S. Patent #2,738,048 issued March 13, 1956 to O.G. Douglas shows a hydraulically regulated and controlled torque coupling device wherein the movement of the flexible wall responds to fluid pressure thereby controlling the speed and torque transmitted to the load.

It is the general object of the present invention to avoid and overcome the foregoing and other difficulties of and objections to prior art practices by the provision of an improved tool of the impulse type which tool has all of the advantages of the stall type, clutch type and impact type tools and none of the disadvantages thereof.

Another object of the present invention is the provision of an impulse tool which is operable to control the final torque on a threaded fastener accurately and precisely within predetermined limits.

Still another object of the present invention is the provision of an impulse tool which, because of the simplicity of its structure, is easy to manufacture.

Yet another object of the present invention is the provision of an impulse tool which provides relatively quiet operation as compared to an impact tool.

A still further object of the present invention is the provision of an impulse tool which is lighter in weight and faster in operation than the tools of the stall type and clutch type.

A further object of the present invention is the provision of a torque limiting device for conventional tools.

The aforesaid objects of the present invention and other objects which will become apparent as the dscription proceeds, are achieved by providing an impulse tool for applying a predetermined torque to an object. The impulse tool has a housing means, spindle means rotatable in the housing means, drive means connected to one of the housing means and the spindle means for causing relative rotation between the housing means and the spindle means. The other of the housing means and the spindle means is connectable to the object, the one being provided with compression chamber means for containing and compressing a fluid and overflow chamber means for receiving fluid from the compression chamber means.

Valve means are disposed in the one between the compression chamber means and the overflow chamber means, with fluid compression means forming an end closure for the compression chamber means. Operating means are carried by the other and are engageable with the fluid compression means during a portion of each revolution of the one, for causing the fluid compression means to pump fluid in the compression chamber means through the valve means into the overflow chamber means and to compress the fluid in the compression chamber means, the fluid compression means being operative during compression of the fluid in the compression chamber means to rotate the other and to apply the predetermined torque to the object.

Further, the impulses tool of the present invention may be employed as a torque limiting device for a conventional tool by driving one of the housing means and the spindle means by the conventional tool.

For a better understanding of the present invention, reference should be had to the accompanying drawings, wherein like numerals of reference indicate similar parts throughout the several views and wherein:

FIG. 10 is a view similar to FIG. 2 showing an operating means of the Scotch Yoke type;

FIG. 11 is a view similar to FIG. 2 showing an operating means of the crankshaft-connecting rod type;

FIG. 12 is a view siimlar to FIG 1A wherein the fluid compression means is on the spindle means and the operating means is on the housing means;

FIG. 13 is a vertical sectional view along the line 13—13 of FIG. 12 in the direction of the arrows;

While the impulse tool of the present invention may be advantageously employed for applying a torque to objects, as a source of fluid impulses, and as a torque limiting device, the impulse tool of the present invention is particularly adapted for use in conjunction with applying a torque to a threaded fastener, as a source of fluid impulses for driving a conventional tool and as a torque limiting device for a conventional tool and hence it has been so illustrated and will be so described.

Figure 1:
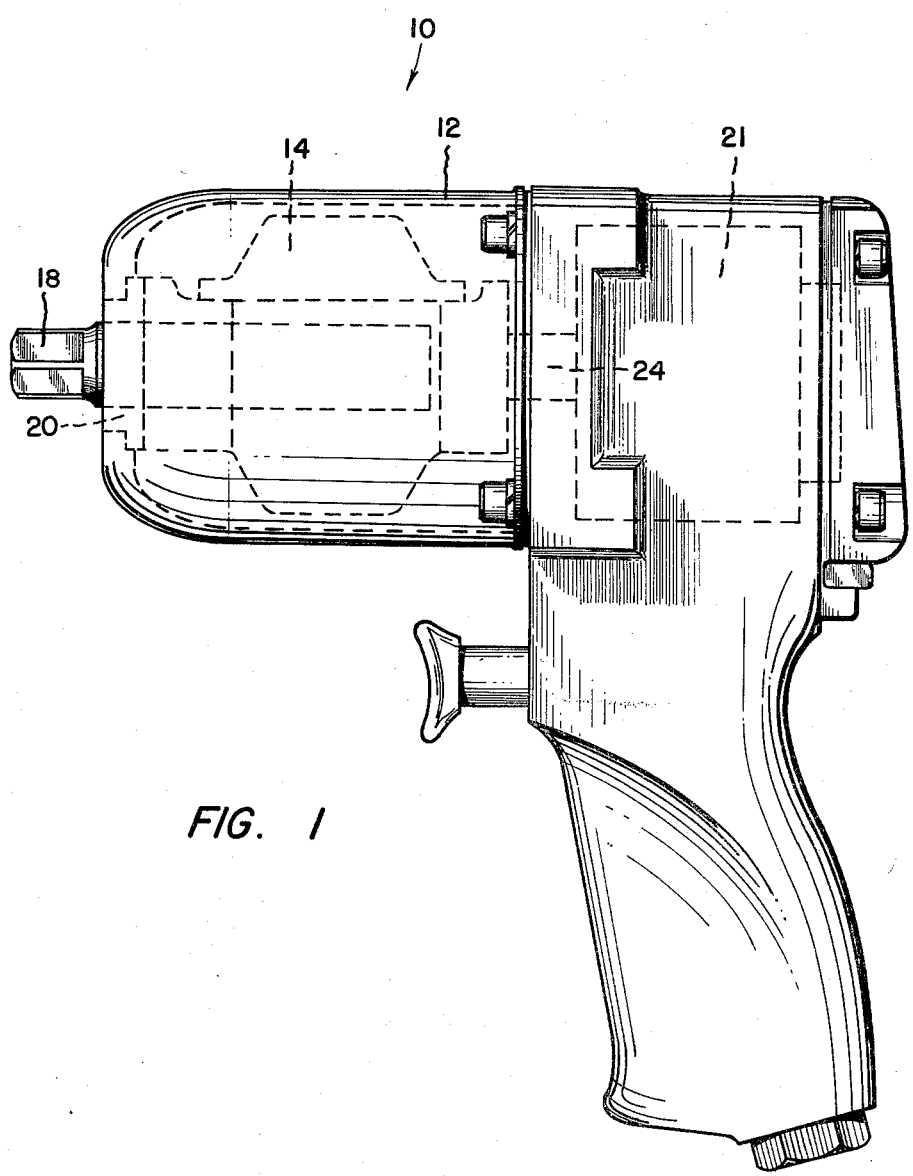
FIG. 1 is a side elevational view of the improved impulse tool of the present invention.
Figure 1A:
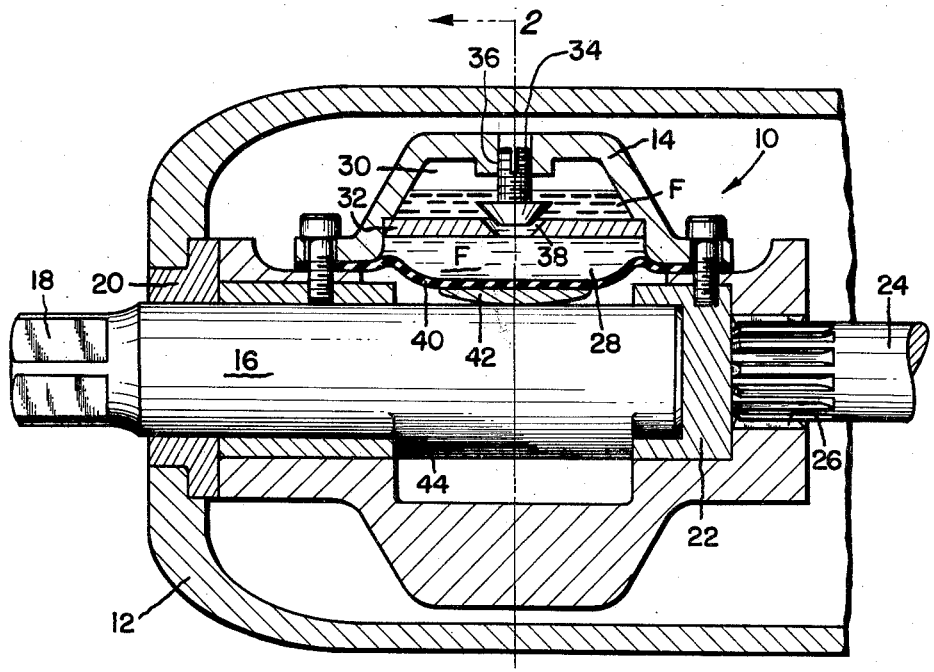
FIG. 1A is a vertical sectional view of the impulse tool shown in FIG. 1 showing the operating means of the spindle means out of engagement with the fluid compression means on the housing means and the drive means connected to the housing means and the fluid compression means comprising a flexible diaphragm.

With specific reference to the form of the invention illustrated in the drawings and referring particularly to FIGS. 1 and 1A, the impulse tool of the present invention is indicated generally by the reference numeral 10. This impulse tool 10 has a casing means, such as a stationary outer housing 12, and a housing means, such as the inner housing 14. A spindle means, such as the spindle 16, is rotatable in the inner housing 14 by means of bearings 20 and 22 (FIG. 1A) and is connectable by means of a socket or square drive 18 (FIGS. 1 and 1A) to an object, such as a threaded fastener (not shown).

A drive means, such as an air or electric motor 21 (FIG. 1), has its drive shaft 24 (FIGS. 1 and 1A) connected by means of a splined connection 26 (FIG. 1A) to the inner housing 14 for causing relative rotation between the inner housing 14 and the spindle 16 (and also the stationary outer housing 12).

Figure 2:
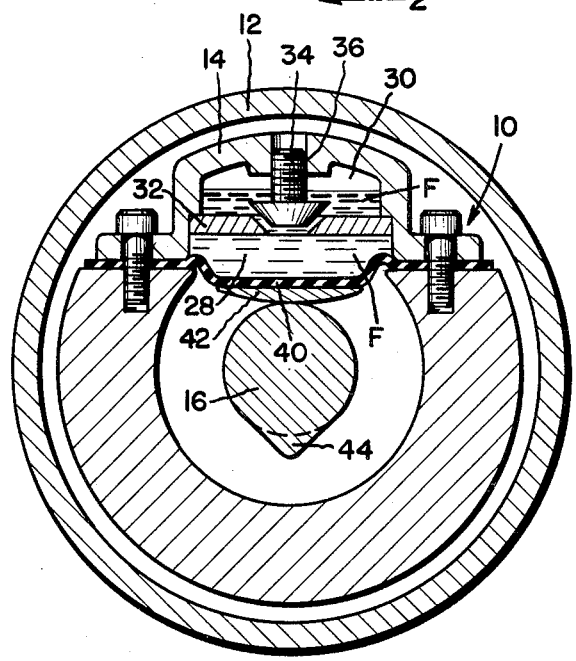
FIG. 2 is a vertical sectional view along the line 2–2 of FIG. 1A in the direction of the arrows.

As shown in FIGS. 1A and 2, the inner housing 14 is provided with compression chamber means, such as a compression chamber 28, for containing and compressing a fluid, such as oil F, and overflow chamber means, such as the overflow chamber 30, for receiving the overflow oil F from the compression chamber 28.

Valve means (FIGS. 1A-3), such as the valve seat plate 32, (which is disposed between the compression chamber 28 and the overflow chamber 30) and a positionable valve stem 34 (which is threadably connected to the inner housing 14 at 36) is employed. The valve stem 34 and valve seat plate 32 define a positionable and restricted leakage orifice 38 through which oil F from the compression chamber 28 is pumped into the overflow chamber 30 as hereinafter explained. Fluid compression means, such as the diaphragm 40 (FIGS. 1A-3) which diaphragm 40 carries a wear plate 42, form an end closure for the compression chamber 28.

Referring again to FIGS. 1A-3, the spindle 16 carries operating means, such as the cam 44, which cam 44 is engageable with the wear plate 42 during a portion of each revolution of the inner housing 14 for causing the diaphragm 40 to pump oil F in the compression chamber 28 through the restricted leakage orifice 38 into the overflow chamber 30 and to compress the remaining oil F in the compression chamber 28. The compressed oil F in the compression chamber 28 maintains the rotating wear plate 42 in engagement with the cam 44 which (due to the resistance of the threaded fastener, not shown, to further tightening) opposes the movement of the wear plate 42 over the cam 44. As a result, during compression of the oil F in compression chamber 28, the wear plate 42 rotates the cam 44, the spindle 16, the socket 18 and the threaded fastener (not shown) to apply a predetermined torque to the threaded fastener.

It will be understood by those skilled in the art that the amount of leakage of oil F from compression chamber 28 into overflow chamber 30 and the pressure developed in the compression chamber 28 is a function of the width of the leakage orifice 38 and the time the cam 44 and wear plate 42 are in engagement, which time is determined by the shape and size of the cam 44.

Figure 3:
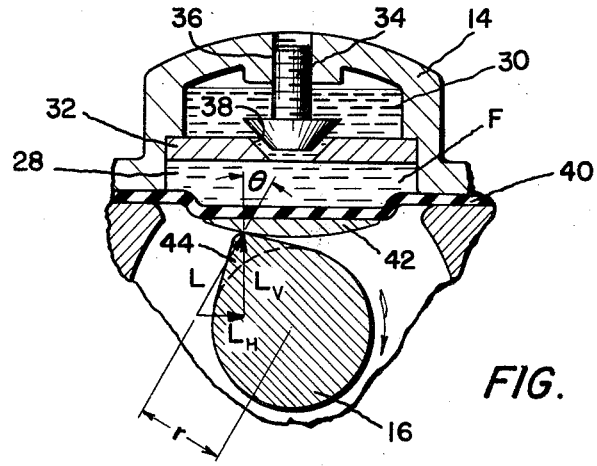
FIG. 3 is a fragmentary view similar to FIG. 2 showing the operating means in engagement with the fluid compression means.

Referring now to FIG. 3, it will be appreciated that the vertical cam force $L_v$ exerted by the cam 44 on the wear plate 42 is equal to $L \cos \theta$ or $$\frac{PA}{\cos \theta}$$

where:

L is the cam lobe force in lbs.;

P is the internal presusre in pounds per square inch (p.s.i.) of the compressed oil F in compression chamber 28 on the diaphragm 40;

A is the effective internal area in square inches of the diaphragm 40; and $\theta$ is the angle in degrees at which the cam force L is applied as measured from the vertical.

In turn, the diaphragm side force $L_H$ (FIG. 3) is equal to $L \sin \theta$ or $$\frac{PA}{\cos \theta} (\sin \theta)$$

or $PA^{\tan \theta}$.

Further, the torque T in foot lbs. applied to the spindle is equal to $rL$ or $$\frac{rPA}{\cos \theta}$$

where:

r is the radius in feet of the spindle 16.

ALTERNATIVE EMBODIMENTS

Valve means

Figure 4:
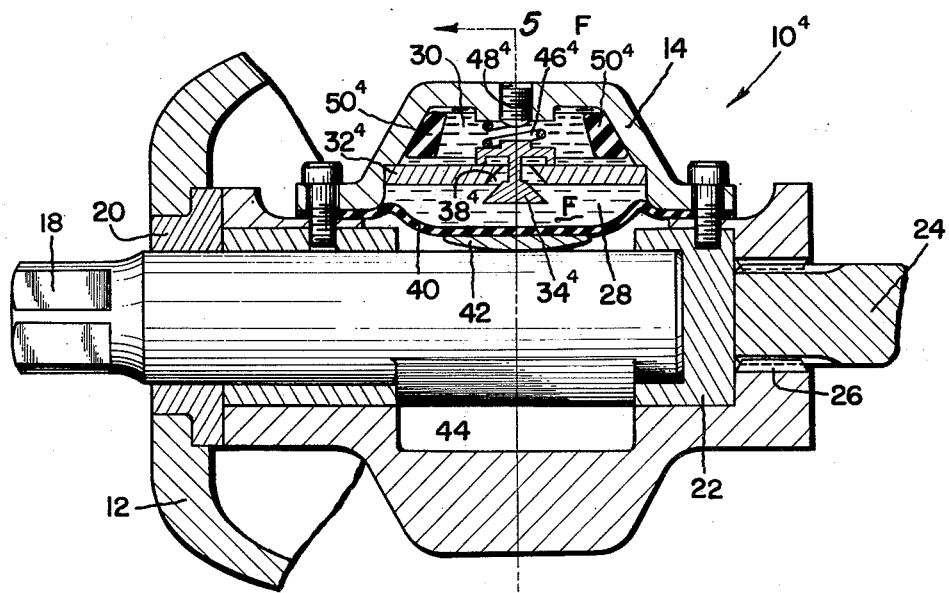
FIG. 4 is a view similar to FIG. 1A of an alternative embodiment having resilient positionable valve means, a fluid filled overflow chamber means and compressible pressure absorbing means in such overflow chamber.
Figure 5:
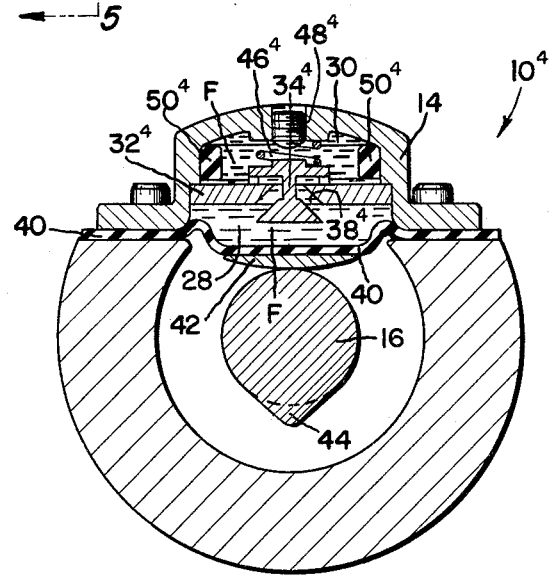
FIG. 5 is a view similar to FIG. 2 taken along the line 5—5 of FIG. 4 in the direction of the arrows.
Figure 6:
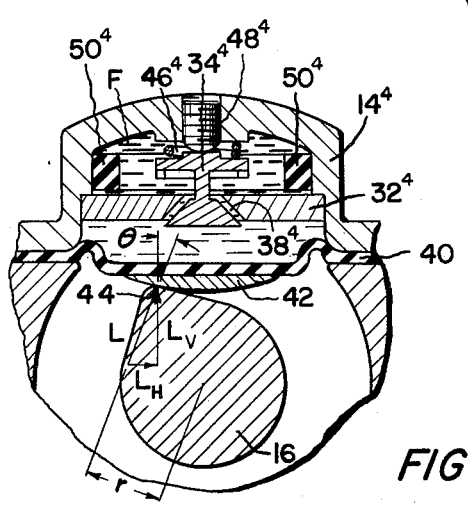
FIG. 6 is a view similar to FIG. 3 showing the operating means of FIG. 4 in engagement with the fluid compression means.

It will be understood by those skilled in the art that alternatively as shown in FIGS. 4-6, a resiliently mounted normally open but closable valve means may be employed. This valve means comprises the valve seat plate $32^4$ and valve stem $34^4$ which valve stem $34^4$ is biased into the normally open position (FIG. 4) by a spring $46^4$. In order to prevent complete closing of the leakage orifice $38^4$ (shown in FIG. 6) an adjustable stop $48^4$ may be threaded into the inner housing $14^4$ to engage the valve stem $34^4$ at the end of its travel thereby retaining it in a position FIG. 6 similar to the position shown in FIGS. 1 and 3.

Pressure absorbing means

For the purpose of eliminating air bubbles in the oil F, the oil F completely fills both the compression chamber $28^4$ and overflow chamber $30^4$, thereby necessitating the use of pressure absorbing means, such as the resilient annular ring $50^4$ (FIGS. 4-6), which ring 50 may be fabricated of a closed cell sponged rubber Viton, the tradename of the E. I. du Pont Co. of Wilmington, Delaware, or it may be hollow and filled with a fluid, such as gas (air, etc.) or a liquid (a silicone fluid, such as Dow Corning 200 series silicone).

Drive means

Figure 7:
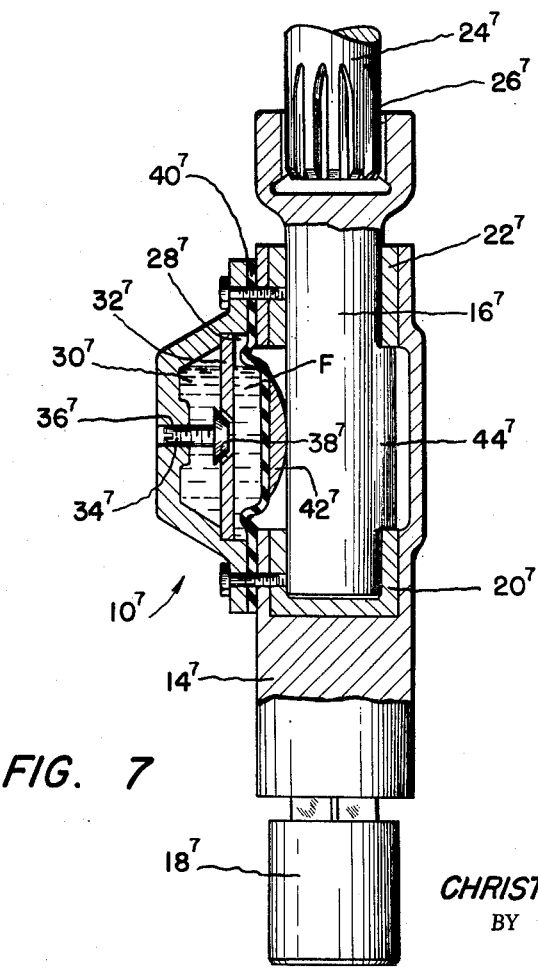
FIG. 7 is a view similar to FIG. 1A but showing the drive means connected to the spindle means.

As shown in FIG. 7, the drive means comprising the motor (not shown), spline connection $26^7$ and drive shaft $24^7$ of the motor (not shown), are connected to the spindle $16^7$ with the cam $44^7$ on the spindle $16^7$ and with the compression chamber $28^7$, etc., in the inner housing $14^7$ which inner housing $14^7$ carries the socket $18^7$.

Fluid compression means

Figure 9:
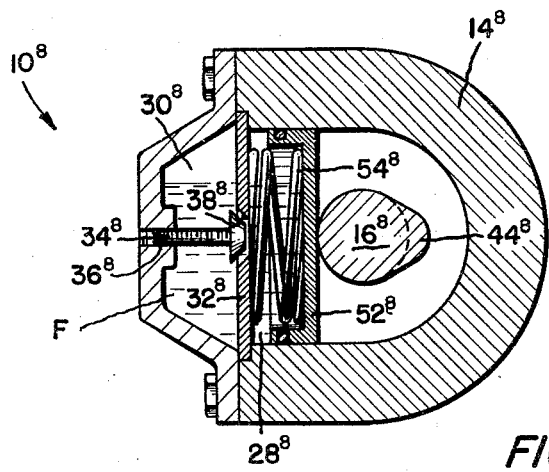
FIG. 9 is a vertical sectional view along the lines 9—9 of FIG. 8 in the direction of the arrows.
Figure 8:
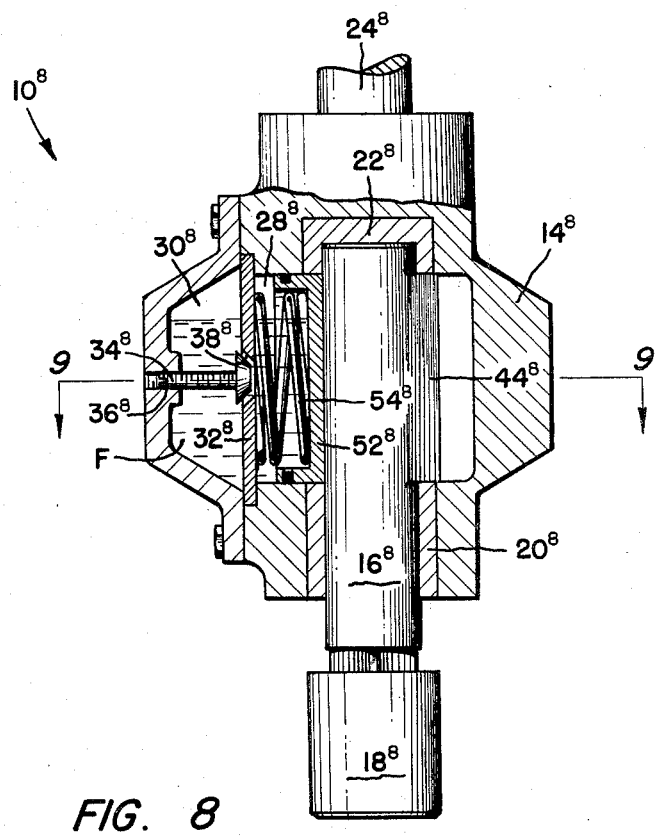
FIG. 8 is a view similar to FIG. 1A wherein the fluid compression means comprises a piston.

In FIGS. 8–9, the fluid compresison means comprises a piston $52^8$ biased by a spring $54^8$ into engagement with the spindle $16^8$ and the cam $44^8$ carried by such piston $16^8$.

Operating means

Referring to FIG. 10, the diaphragm $40^{10}$ carries a U-shaped mounting bracket $56^{10}$ provided with a (straight, not shown, or arcuate) slot $58^{10}$ in both depending legs of the mounting bracket $56$ with a pin $60^{10}$ carried by the spindle $16^{10}$ riding in the slots $58^{10}$ thereby achieving vertical flexing or reciprocation of the diaphragm.

In FIG. 11, the spindle $16^{11}$ carries a crank pin $62^{11}$ with a connecting rod $64^{11}$ thereon. The connecting rod $64^{11}$ is connected by a wrist pin $66^{11}$ to a U-shaped bracket $68^{11}$ on the diaphragm $40^{11}$.

Further, as shown in FIGS. 12–13, the operating means, such as the cam $44^{12}$, is carried by the inner housing $14^{12}$ and the compression chamber $28^{12}$, etc., carried by the spindle $16^{12}$.

Summarizing the above description and referring to U.S. Patent No. 3,116,617 granted January 7, 1964 to D. K. Skoog, it will be apparent that the following combinations of the essential elements of the impulse tool may be used as indicated in the following table:

| Driven Member | Member Having Cam 44, etc. | Member Having Chamber 28, etc. | Fig. No. |
| --- | --- | --- | --- |
| Housing | Spindle | Housing | Fig. 1–3. |
| Housing | Housing | Spindle | (Not shown.) |
| Spindle | Spindle | Housing | Fig. 7. |
| Spindle | Housing | Spindle | (Not shown.) |

Use of impulse tool as a torque limiting device

Figure 14:
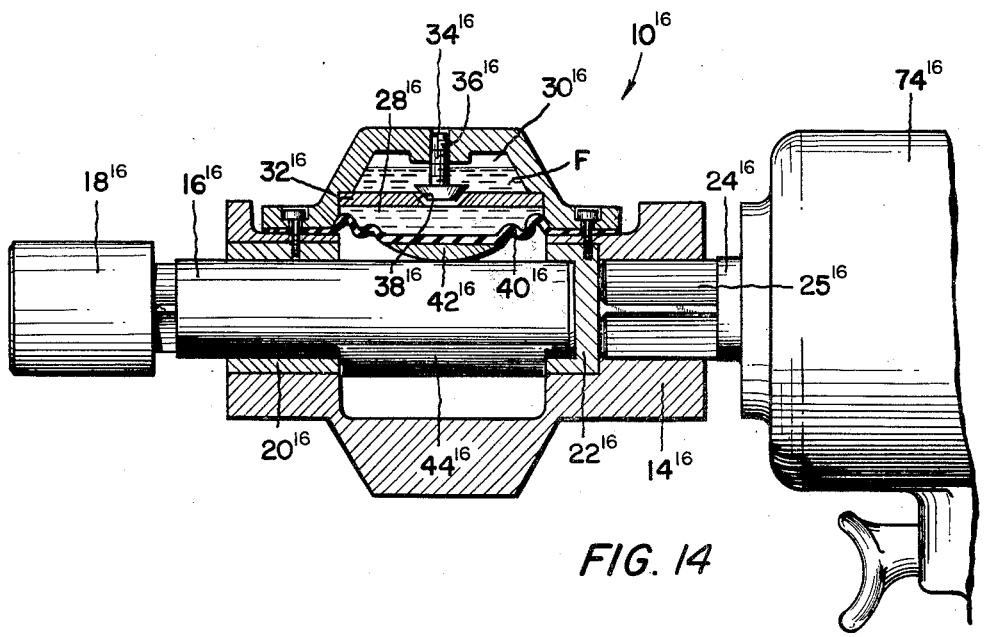
FIG. 14 is a side elevational view of a conventional impact tool connected to the impulse tool of the present invention wherein the impulse tool has the housing means, driven by the impact tool, the compression chamber means, etc., is in the housing means and the operating means is on the spindle meas.
Figure 15:
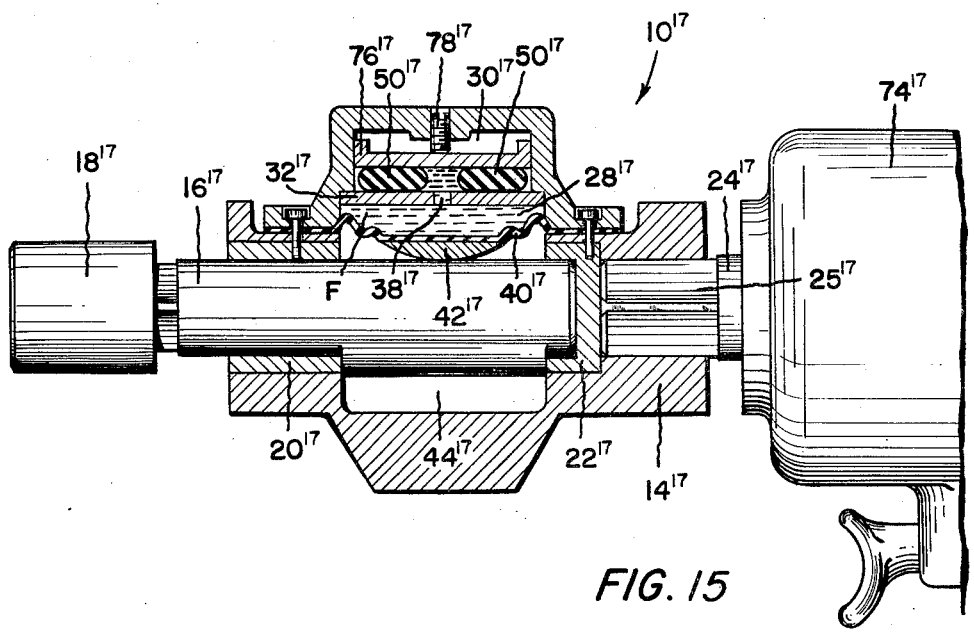
FIG. 15 is a view similar to FIG. 14 wherein the compression chamber means, etc., are replaced by a piston, adjustment screw and pressure absorbing means.

In FIGS. 14 and 15 the impulse tools $10^{16}$ (FIG. 14) and $10^{17}$ (FIG. 15) are used as torque limiting devices for a conventional impact tool $74^{17}$ and $74^{18}$, respectively, as for example one of the type shown in U.S. Reissue Patent #24,269 issued January 29, 1957 to M. E. Disser. In FIGS. 14 and 15 the impact tools $74^{16}$ and $74^{17}$ have their drive shafts $24^{16}$ and $24^{17}$ connected by a square drive $25^{16}$, $25^{17}$ or a splined connection (not shown) to the inner housings $14^{16}$, $14^{17}$, respectively. The compression chambers $28^{16}$, $28^{17}$, etc., are in the inner housings $14^{16}$, $14^{17}$. The cams $44^{16}$, $44^{17}$ are carried by the spindles $16^{16}$, $16^{17}$, respectively.

In each embodiment the impulse tools $10^{16}$, $10^{17}$ will continue to transmit torque to the sockets $18^{16}$, $18^{17}$ until the predetermined torque of such tools $10^{16}$, $10^{17}$ is reached. Thereafter, during continued operation of impact tools $74^{16}$, $75^{17}$ the jaws (not shown) of the impact tools $74^{16}$, $74^{17}$ will slip and no greater torque than the limit of the impulse tool $10^{16}$, $10^{17}$ will be delivered because of the characteristic operation of impulse tools $10^{16}$, $10^{17}$. At the torque transmission limit leakage of oil F into or expansion of oil F in overflow chambers $30^{10}$, $30^{17}$ prevents an increase in further torque transmission through impulse tools $10^{16}$, $10^{17}$ to sockets $18^{16}$, $18^{17}$.

Referring particularly to FIG. 15, the overflow chamber $30^{17}$ is defined by the valve seat plate $32^{17}$ and a pressure means, such as the pressure plate $76^{17}$. Such overflow chamber $30^{17}$ is filled with oil F and a resilient annular ring $50^{17}$. Increased compression of the annular ring $50^{17}$ by tightening the screw $78^{17}$ against the pressure plate $76^{17}$ increases the torque output of the impulse tool $10^{17}$ and hence its torque limiting effect on the impact tool $74^{17}$.

It will be understood by those skilled in the art that the embodiments shown in FIGS. 1–13 can be incorporated into the impulse tool when used as a torque limiting device (FIGS. 14–15).

Further, as shown by the following table, various combinations of the essential elements of the impulse tool when used as a torque limiting device:

| Driven Member | Member Having Cam 44, etc. | Member Having Chamber 28, etc. | Fig. No. |
| --- | --- | --- | --- |
| Housing | Spindle | Housing | 14, 15. |
| Housing | Housing | Spindle | (Not shown.) |
| Spindle | Spindle | Housing | (Not shown.) |
| Spindle | Housing | Spindle | (Not shown.) |

It will be recognized by those skilled in the art that the objects of the present invention have been achieved by providing an impulse tool which has minimum wear and attendant longer service life than conventional impact tools.

The impulse tool of the present invention is operable to control the final torque on a threaded fastener accurately and precisely within predetermined practical limits. Further, because of the simplicity of its structure, the impulse tool is easy and economical to manufacture. In addition, the impulse tool provides relatively quiet operation as compared with conventional impact tools. The impulse tool has all of the advantages of the stall type, clutch type and impact type tools and none of the disadvantages thereof; is lighter in weight and faster in operation than the tools of the stall type and clutch type. The present invention also contemplates the use of the impulse tool as a source of fluid impulses, which impulses can be utilized to drive a conventional reciprocating tool, such as a hammer, or a conventional rotary tool, such as a drill. The impulse tool is also operable as a torque limiting device for use with conventional tools.

While in accordance with the patent statutes preferred and alternative embodiments of the present invention have been illustrated and described in detail, it is to be particularly understood that the invention is not limited thereto or thereby.

I claim:
1. An impulse tool for applying a predetermined torque to an object and comprising:
  (a) housing means,
  (b) spindle means rotatable in said housing means,
  (c) drive means connected to one of said housing means and said spindle means for causing relative rotation between said housing means and said spindle means,
  (d) the other of said housing means and said spindle means being connectable to said object,
  (e) said one being provided with:
    (1) compression chamber means for containing and compressing a fluid and
    (2) overflow chamber means for receiving fluid from said compression chamber means,
  (f) valve means disposed in said one between said compression chamber means and said overflow chamber means,
  (g) fluid compression means forming an end closure for said compression chamber means,
  (h) operating means carried by said other and engageable with said fluid compression means during a portion of each revolution of said one, for causing said fluid compression means to pump fluid in said compression chamber means through said valve means into said overflow chamber means and to compress said fluid in said compression chamber means,

(i) said fluid compression means being operative during compression of said fluid in said compression chamber means to rotate said other and to apply said predetermined torque to said object.

2. An impulse tool for applying a predetermined torque to an object and comprising:
(a) housing means,
(b) spindle means rotatable in said housing means,
(c) drive means connected to one of said housing means and said spindle means for causing relative rotation between said housing means and said spindle means,
(d) the other of said housing means and said spindle means being connectable to said object,
(e) said other being provided with:
   (1) compression chamber means for containing and compressing a fluid and
   (2) overflow chamber means for receiving fluid from said compression chamber means,
(f) valve means disposed in said other between said compression chamber means and said overflow chamber means,
(g) fluid compression means forming an end closure for said compression chamber means,
(h) operating means carried by said one and engageable with said fluid compression means during a portion of each revolution of said one, for causing said fluid compression means to pump fluid in said compression chamber means through said valve means into said overflow chamber means and to compress said fluid in said compression chamber means,
(i) said fluid compression means being operative during compression of said fluid in said compression chamber means to rotate said other and to apply said predetermined torque to said object.

3. An impulse tool for applying a predetermined torque to an object and comprising:
(a) housing means,
(b) spindle means rotatable in said housing means,
(c) drive means connected to said housing means for causing relative rotation between said housing means and said spindle means,
(d) said spindle means being connectable to said object,
(e) said housing means being provided with:
   (1) compression chamber means for containing and compressing a fluid and
   (2) overflow chamber means for receiving fluid from said compression chamber means,
(f) valve means disposed in said housing means between said compression chamber means and said overflow chamber means,
(g) fluid compression means forming an end closure for said compression chamber means,
(h) operating means carried by said spindle means and engageable with said fluid compression means during a portion of each revolution of said housing means for causing said fluid compression means to pump fluid in said compression chamber means through said valve means into said overflow chamber means and to compress said fluid in said compression chamber means,
(i) said fluid compression means being operative during compression of said fluid in said compression chamber means to rotate said spindle means and to apply said predetermined torque to said object.

4. An impulse tool for applying a predetermined torque to an object and comprising:
(a) housing means,
(b) spindle means rotatable in said housing means,
(c) drive means connected to said housing means for causing relative rotation between said housing means and said spindle means,
(d) said spindle means being connectable to said object,
(e) said spindle means being provided with:
   (1) compression chamber means for containing and compressing a fluid and
   (2) overflow chamber means for receiving fluid from said compression chamber means,
(f) valve means disposed in said spindle means between said compression chamber means and said overflow chamber means,
(g) fluid compression means forming an end closure for said compression chamber means,
(h) operating means carried by said housing means and engageable with said fluid compression means during a portion of each revolution of said housing means for causing said fluid compression means to pump fluid in said compression chamber means through said valve means into said overflow chamber means and to compress said fluid in said compression chamber means,
(i) said fluid compression means being operative during compression of said fluid in said compression chamber means to rotate said spindle means and to apply said predetermined torque to said object.

5. An impulse tool for applying a predetermined torque to an object and comprising:
(a) housing means,
(b) spindle means rotatable in said housing means,
(c) drive means connected to said spindle means for causing relative rotation between said housing means and said spindle means,
(d) said housing means being connectable to said object,
(e) said housing means being provided with:
   (1) compression chamber means for containing and compressing a fluid and
   (2) overflow chamber means for receiving fluid from said compression chamber means,
(f) valve means disposed in said housing means between said compression chamber means and said overflow chamber means,
(g) fluid compression means forming an end closure for said compression chamber means,
(h) operating means carried by said spindle means and engageable with said fluid compression means during a portion of each revolution of said spindle means causing said fluid compression means to pump fluid in said compression chamber means through said valve means into said overflow chamber means and to compress said fluid in said compression chamber means,
(i) said fluid compression means being operative during compression of said fluid in said compression chamber means to rotate said housing means and to apply said predetermined torque to said object.

6. An impulse tool for applying a predetermined torque to an object and comprising:
(a) housing means,
(b) spindle means rotatable in said housing means,
(c) drive means connected to said spindle means for causing relative rotation between said housing means and said spindle means,
(d) said housing means being connectable to said object,
(e) said spindle means being provided with:
   (1) compression chamber means for containing and compressing a fluid and
   (2) overflow chamber means for receiving fluid from said compression chamber means,
(f) valve means disposed in said spindle means between said compression chamber means and said overflow chamber means,
(g) fluid compression means forming an end closure for said compression chamber means,
(h) operating means carried by said housing means and engageable with said fluid compression means during a portion of each revolution of said spindle means for causing said fluid compression means to pump fluid in said compression chamber means through said valve means into said overflow chamber means and to compress said fluid in said compression chamber means,
  (i) said fluid compression means being operative during compression of said fluid in said compression chamber means to rotate said housing means and to apply said predetermined torque to said object.

7. The impulse tool recited in claim 1 wherein said valve means is resiliently mounted and closable by the compressed fluid in said compression chamber means.

8. The impulse tool recited in claim 1 wherein said compression chamber means and said overflow means are substantially filled with fluid, and pressure absorbing means in said overflow chamber means to yieldingly permit increases of fluid pressure therein.

9. The impulse tool recited in claim 1 wherein said valve means is resiliently mounted, and stop means in said one for limiting the closure of said valve means.

10. The impulse tool recited in claim 1 wherein said fluid compression means comprises a flexible diaphragm.

11. The impulse tool recited in claim 1 wherein said fluid compression means comprises a piston.

12. The impulse tool recited in claim 1 wherein the operating means comprises a cam.

13. The impulse tool recited in claim 1 wherein the operating means comprises a scotch-yoke arrangement.

14. The impulse tool recited in claim 1 wherein the operating means comprises a crankshaft-connecting rod arrangement.

15. The impulse tool recited in claim 2 wherein said valve means is resiliently mounted and closable by the compressed fluid in said compression chamber means.

16. The impulse tool recited in claim 2 wherein said compression chamber means and said overflow means are substantially filled with fluid, and pressure absorbing means in said overflow chamber means to yieldingly permit increases of fluid pressure therein.

17. The impulse tool recited in claim 2 wherein said valve means is resiliently mounted, and stop means in said one for limiting the closure of said valve means.

18. The impulse tool recited in claim 2 wherein said fluid compression means comprises a flexible diaphragm.

19. The impulse tool recited in claim 2 wherein said fluid compression means comprises a piston.

20. The impulse tool recited in claim 2 wherein the operating means comprises a cam.

21. The impulse tool recited in claim 2 wherein the operating means comprises a scotch-yoke arrangement.

22. The impulse tool recited in claim 2 wherein the operating means comprises a crankshaft-connecting rod arrangement.

23. In combination with impact tool having drive means, an impulse type torque limiting device for applying a predetermined torque to an object and comprising:
  (a) housing means,
  (b) spindle means rotatable in said housing means,
  (c) said drive means connected to one of said housing means and said spindle means for causing relative rotation between said housing means and said spindle means,
  (d) the other of said housing means and said spindle means being connectable to said object,
  (e) said other being provided with:
    (1) compression chamber means for containing and compressing a fluid and
    (2) overflow chamber means for receiving fluid from said compression chamber means,
  (f) valve means disposed in said other between said compression chamber means and said overflow chamber means,
  (g) fluid compression means forming an end closure for said compression chamber means,
  (h) operating means carried by said one and engageable with said fluid compression means during a portion of each revolution of said one, for causing said fluid compression means to pump fluid in said compression chamber means through said valve means into said overflow chamber means and to compress said fluid in said compression chamber means,
  (i) said fluid compression means being operative during compression of said fluid in said compression chamber means to rotate said other and to apply said predetermined torque to said object.

24. In combination with impact tool having drive means, an impulse type torque limiting device for applying a predetermined torque to an object and comprising:
  (a) housing means,
  (b) spindle means rotatable in said housing means,
  (c) said drive means connected to one of said housing means and said spindle means for causing relative rotation between said housing means and said spindle means,
  (d) the other of said housing means and said spindle means being connectable to said object,
  (e) said one being provided with:
    (1) compression chamber means for containing and compressing a fluid and
    (2) overflow chamber means for receiving fluid from said compression chamber means,
  (f) valve means disposed in said one between said compression chamber means and said overflow chamber means,
  (g) fluid compression means forming an end closure for said compression chamber means,
  (h) operating means carried by said other and engageable with said fluid compression means during a portion of each revolution of said one, for causing said fluid compression means to pump fluid in said compression chamber means through said valve means into said overflow chamber means and to compress said fluid in said compression chamber means,
  (i) said fluid compression means being operative during compression of said fluid in said compression chamber means to rotate said other and to apply said predetermined torque to said object.

25. In combination with impact tool having drive means, an impulse type torque limiting device for applying a predetermined torque to an object and comprising:
  (a) housing means,
  (b) spindle means rotatable in said housing means,
  (c) said drive means connected to said housing means for causing relative rotation between said housing means and said spindle means,
  (d) said spindle means being connectable to said object,
  (e) said housing means being provided with:
    (1) compression chamber means for containing and compressing a fluid and
    (2) overflow chamber means for receiving fluid from said compression chamber means,
  (f) valve means disposed in said housing means between said compression chamber means and said overflow chamber means,
  (g) fluid compression means forming an end closure for said compression chamber means,
  (h) operating means carried by said spindle means and engageable with said fluid compression means during a portion of each revolution of said housing means for causing said fluid compression means to pump fluid in said compression chamber means through said valve means into said overflow chamber means and to compress said fluid in said compression chamber means,
  (i) said fluid compression means being operative during compression of said fluid in said compression chamber means to rotate said spindle means and to apply said predetermined torque to said object.

26. In combination with impact tool having drive means, an impulse type torque limiting device for applying a predetermined torque to an object and comprising:
(a) housing means,
(b) spindle means rotatable in said housing means,
(c) said drive means connected to said housing means for causing relative rotation between said housing means and said spindle means,
(d) said spindle means being connectable to said object,
(e) said spindle means being provided with:
   (1) compression chamber means for containing and compressing a fluid and
   (2) overflow chamber means for receiving fluid from said compression chamber means,
(f) valve means disposed in said spindle means between said compression chamber means and said overflow chamber means,
(g) fluid compression means forming an end closure for said compression chamber means,
(h) operating means carried by said housing means and engageable with said fluid compression means during a portion of each revolution of said spindle means causing said fluid compression means to pump fluid in said compression chamber means through said valve means into said overflow chamber means and to compress said fluid in said compression chamber means,
(i) said fluid compression means being operative during compression of said fluid in said compression chamber means to rotate said spindle means and to apply said predetermined torque to said object.

27. In combination with impact tool having drive means, an impulse type torque limiting device for applying a predetermined torque to an object and comprising:
(a) housing means,
(b) spindle means rotatable in said housing means,
(c) said drive means connected to said spindle means for causing relative rotation between said housing means and said spindle means,
(d) said housing means being connectable to said object,
(e) said spindle means being provided with:
   (1) compression chamber means for containing and compressing a fluid and
   (2) overflow chamber means for receiving fluid from said compression chamber means,
(f) valve means disposed in said spindle means between said compression chamber means and said overflow chamber means,
(g) fluid compression means forming an end closure for said compression chamber means,
(h) operating means carried by said housing means and engageable with said fluid compression means during a portion of each revolution of said spindle means for causing said fluid compression means to pump fluid in said compression chamber means through said valve means into said overflow chamber means and to compress said fluid in said compression chamber means,
(i) said fluid compression means being operative during compression of said fluid in said compression chamber means to rotate said housing means and to apply said predetermined torque to said object.

28. In combination with impact tool having drive means, an impulse type torque limiting device for applying a predetermined torque to an object and comprising:
(a) housing means,
(b) spindle means rotatable in said housing means,
(c) said drive means connected to said spindle means for causing relative rotation between said housing means and said spindle means.
(d) said housing means being connectable to said object,
(e) said housing means being provided with:
   (1) compression chamber means for containing and compressing a fluid and
   (2) overflow chamber means for receiving fluid from said compression chamber means,
(f) valve means disposed in said housing means between said compression chamber means and said overflow chamber means,
(g) fluid compression means forming an end closure for said compression chamber means,
(h) operating means carried by said spindle means and engageable with said fluid compression means during a portion of each revolution of said spindle means for causing said fluid compression means to pump fluid in said compression chamber means through said valve means into said overflow chamber means and to compress said fluid in said compression chamber means,
(i) said fluid compression means being operative during compression of said fluid in said compression chamber means to rotate said housing means and to apply said predetermined torque to said object.

29. The combination recited in claim 23 wherein said valve means is resiliently mounted and closable by the compressed fluid in said compression chamber means.

30. The combination recited in claim 23 wherein said compression chamber means and said overflow means are substantially filled with fluid, and pressure absorbing means in said overflow chamber means to yieldingly permit increases of fluid pressure therein.

31. The combination recited in claim 23 wherein said valve means is resiliently mounted, and stop means in said one for limiting the closure of said valve means.

32. The combination recited in claim 23 wherein said fluid compression means comprises a flexible diaphragm.

33. The combination recited in claim 23 wherein said fluid compression means comprises a piston.

34. The combination recited in claim 23 wherein the operating means comprises a cam.

35. The combination recited in claim 23 wherein the operating means comprises a scotch-yoke arrangement.

36. The combination recited in claim 23 wherein the operating means comprises a crankshaft-connecting rod arrangement.

37. The combination recited in claim 24 wherein said valve means is resiliently mounted and closable by the compressed fluid in said compression chamber means.

38. The combination recited in claim 24 wherein said compression chamber means and said overflow means are substantially filled with fluid, and pressure absorbing means in said overflow chamber means to yieldingly permit increases of fluid pressure therein.

39. The combination recited in claim 24 wherein said valve means is resiliently mounted, and stop means in said one for limiting the closure of said valve means.

40. The combination recited in claim 24 wherein said fluid compression means comprises a flexible diaphragm.

41. The combination recited in claim 24 wherein said fluid compression means comprises a piston.

42. The combination recited in claim 24 wherein the operating means comprises a cam.

43. The combination recited in claim 24 wherein the operating means comprises a scotch-yoke arrangement.

44. The combination recited in claim 24 wherein the operating means comprises a crankshaft-connecting rod arrangement.

References Cited by the Examiner

UNITED STATES PATENTS

| | | | |
|---|---|---|---|
| 1,719,502 | 7/29 | Dienner | 60—4.5 |
| 2,526,388 | 10/50 | Miller | 60—54.5 |
| 2,986,024 | 5/61 | Power | 64—26 |
| 3,116,617 | 1/64 | Skogg | 64—26 |

BROUGHTON G. DURHAM, *Primary Examiner.*

ROBERT C. RIORDON, *Examiner.*